Figure 1:
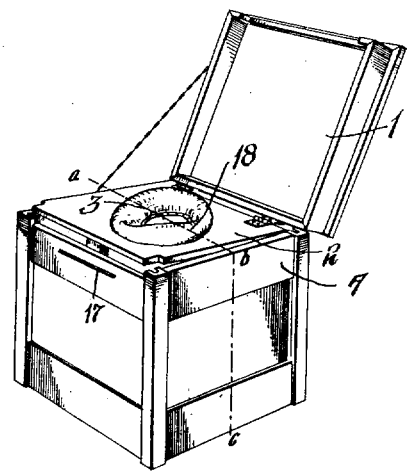

J. H. KING.
SANITARY CLOSET.
APPLICATION FILED SEPT. 22, 1910.

1,017,675.

Patented Feb. 20, 1912.

2 SHEETS—SHEET 1.

Witnesses
Alan F. Gamer
H. Dittman

Inventor
James H. King

By Victor J. Evans
Attorney

J. H. KING.
SANITARY CLOSET.
APPLICATION FILED SEPT. 22, 1910.

1,017,675.

Patented Feb. 20, 1912.

2 SHEETS—SHEET 2.

Inventor
James H. King

Witnesses
Alan F. Gainer
C. Dittmar

By Victor J. Evans
Attorney

UNITED STATES PATENT OFFICE.

JAMES H. KING, OF PACIFIC GROVE, CALIFORNIA.

SANITARY CLOSET.

1,017,675. Specification of Letters Patent. Patented Feb. 20, 1912.

Application filed September 22, 1910. Serial No. 583,303.

*To all whom it may concern:*

Be it known that I, JAMES H. KING, a citizen of the United States, residing at Pacific Grove, in the county of Monterey and State of California, have invented new and useful Improvements in Sanitary Closets, of which the following is a specification.

This invention relates to new and useful improvements in commodes, the purpose being to produce a sanitary device to prevent the transmission of disease and insure cleanliness.

These and other objects may be attained by means of the construction shown in the accompanying drawings, in which like reference characters designate like parts in all the figures.

Figure 2:
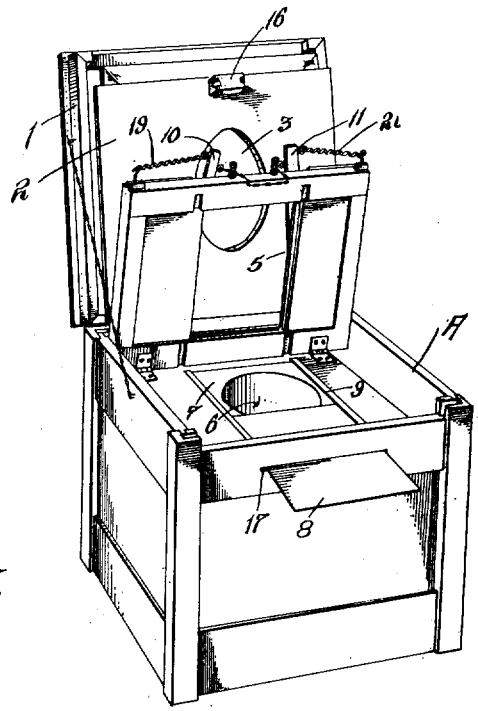
Figure 3:
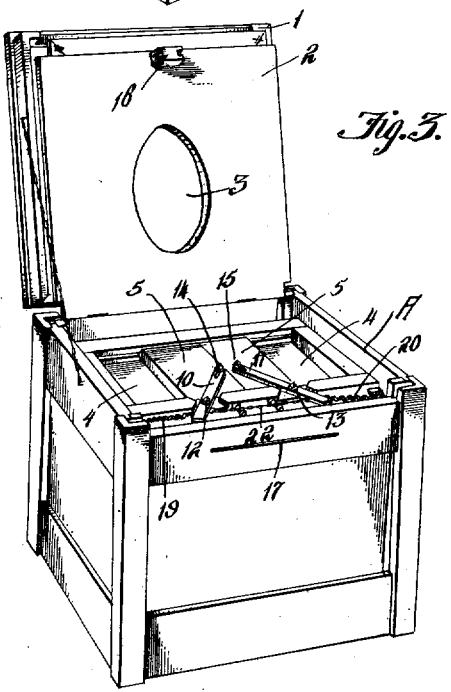
Figure 6:
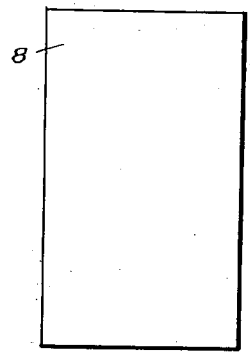
Figure 4:
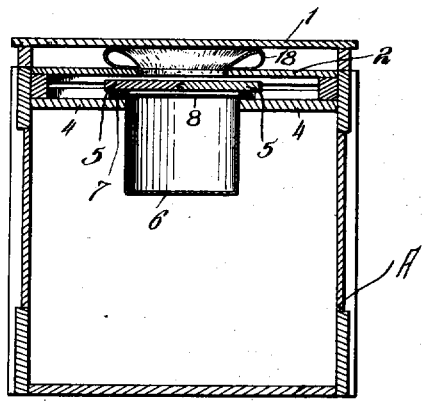
Figure 7:
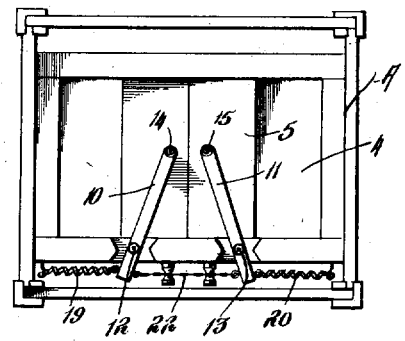
Figure 5:
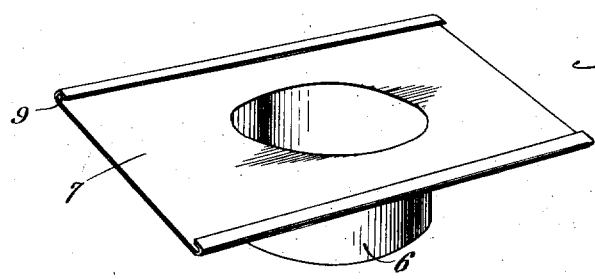

In the drawings:—Figure 1 is a perspective view of the commode in an open position ready for use. Fig. 2 is a similar view with the seat and trap raised. Fig. 3 is a similar view with the seat raised and the trap closed. Fig. 4 is a sectional view along the line $a$—$b$—$c$, of Fig. 1. Fig. 5 is a detail perspective view of the receptacle. Fig. 6 is a detail plan view of the sliding cover thereof. Fig. 7 is a detail view, showing the construction of the mechanism operating the sliding trap.

Referring to the drawings A represents the body of the commode with which the cover 1 and the seat 2 are hingedly connected, the same being provided with an aperture 3. A trap floor 4 is likewise hingedly connected with the body of the commode below the seat, said trap floor supporting the trap which is composed of two slidable door members 5, 5. The receptacle 6, which is detachably supported below the trap floor, is provided with a supporting flange 7 bent to form longitudinal grooves 9 at the sides thereof for the reception of a sliding cover 8. To operate the door members constituting the trap, levers 10 and 11 are provided, said levers being fulcrumed upon the trap floor at 12, 13, and said levers being pivotally connected at 14, 15 with the door members 5. Springs 19, 20 are connected with the free ends of the levers 10 and 11 to actuate the latter so as to force the door members 5 to an obstructing position between the receptacle and the aperture 3 in the seat. The levers 10 and 11 are also connected together by a flexible member, such as a chain 22. The seat 2 carries a block 16 adapted to engage the chain 22 to depress the latter for the purpose of actuating the levers to open the trap. The front of the commode has a slot 17 for the passage of the slide 8. An air cushion 18 surrounds the aperture 3 in the seat.

In the operation of the device, after the cover 1 is raised, the weight of the body upon the seat forces the block 16 down upon the chain 22, thereby actuating the levers 10 and 11 to open the trap by forcing the door members 5 composing the trap apart from each other, thus leaving the receptacle 6 unobstructed. When the weight is removed from the seat, the tension of the springs 19 and 20 will be exerted to close the trap by moving the door members 5 to an obstructing position. The cover 1 may then be closed, and the slide 8 inserted through the slot 17 in order to more completely cover the receptacle 6, said slide engaging the grooved flanges 9.

It will be seen from the foregoing description that the improved commode is simple in construction, clean, sanitary and in every respect serviceable.

Having thus described my invention, what I claim and desire to secure by Letters-Patent, is:—

1. In a commode, a trap floor, a trap composed of door members slidably guided thereon, levers fulcrumed upon the trap floor and connected pivotally with the door members, actuating springs engaging the levers to force the door members to an obstructing position, a flexible member connecting the free ends of the levers, and a hingedly supported seat having a block engaging the flexible member to actuate the levers against the tension of the springs.

2. In a commode, a hingedly supported seat, a hingedly supported trap floor below the seat, and a receptacle supported detachably below and adjacent to the trap floor, said trap floor being provided with a trap composed of two slidably supported door members, spring actuated levers to operate said door members, and a flexible element connecting the levers, the seat being provided with a block engaging the flexible element to actuate the levers against the tension of the springs.

3. In a commode, a detachable receptacle, having a supporting flange provided with longitudinal grooves, a trap floor supported hingedly above and adjacent to the receptacle, trap doors slidable upon said trap floor, spring actuated operating levers for the trap doors, a flexible element connecting the levers, a hingedly supported seat having a block engaging the flexible element, a hinged cover, and a slide engaging the grooves upon the flange of the receptacle, the body of the commode being provided with a slot for the admission of a slide.

In testimony whereof I affix my signature in presence of two witnesses.

JAMES H. KING.

Witnesses:
G. H. BURNETTE,
F. L. TUTTLE.

Copies of this patent may be obtained for five cents each, by addressing the "Commissioner of Patents, Washington, D. C."